FIG. 1.

INVENTORS
JAMES R. BIARD
ARTHUR H. BROOK
MILTON C. CLERC &
SHANNON E. YOUNG

BY *Stevens, Davis, Miller & Mosher*
ATTORNEYS

FIG. 2.

Feb. 15, 1966  J. R. BIARD ETAL  3,235,802
PROGRAMMABLE APPARATUS FOR AUTOMATICALLY AND SEQUENTIALLY
PERFORMING A PLURALITY OF TESTS ON A TRANSISTOR
Filed Sept. 21, 1960  9 Sheets-Sheet 3

INVENTORS
JAMES R. BIARD
ARTHUR H. BROOK
MILTON C. CLERC &
SHANNON E. YOUNG
BY
*Stevens, Davis Miller & Mosher*
ATTORNEYS

INVENTORS
JAMES R. BIARD
ARTHUR H. BROOK
MILTON C. CLERC &
SHANNON E. YOUNG

BY

ATTORNEYS

Feb. 15, 1966    J. R. BIARD ETAL    3,235,802
PROGRAMMABLE APPARATUS FOR AUTOMATICALLY AND SEQUENTIALLY
PERFORMING A PLURALITY OF TESTS ON A TRANSISTOR
Filed Sept. 21, 1960    9 Sheets-Sheet 7

FIG. 8.

INVENTORS
JAMES R. BIARD
ARTHUR H. BROOK
MILTON C. CLERC &
SHANNON E. YOUNG
BY *Stevens, Davis, Miller & Mosher*
ATTORNEYS

United States Patent Office

3,235,802
Patented Feb. 15, 1966

3,235,802
PROGRAMMABLE APPARATUS FOR AUTOMATICALLY AND SEQUENTIALLY PERFORMING A PLURALITY OF TESTS ON A TRANSISTOR
James R. Biard, Richardson, Arthur H. Brook, Bellaire, and Milton C. Clerc and Shannon E. Young, Houston, Tex., assignors to Texas Instruments Incorporated, Dallas, Tex., a corporation of Delaware
Filed Sept. 21, 1960, Ser. No. 57,528
5 Claims. (Cl. 324—158)

This invention relates to the testing of semiconductor devices such as transistors and diodes, and more particularly relates to an analog and digital system which rapidly and automatically performs sequences of tests on semiconductor devices and which records the test results in digital form.

The use of transistors in the electronic industry has increased tremendously in recent years. Electronic circuits in numerous fields such as communications, high speed computation, control and measuring and testing have undergone wide-spread transistorization. The computer field, especially, is one in which the transistor has been subjected to considerable mass use. Shift registers, arithmetic units, switching and other logical circuitry, and memory elements all may require a large number of transistors. If one transistor out of the many which are present in each portion of a computer does not meet desired standards and ratings (and the computer does not function properly on account of this), it may take considerable time to discover which transistor is the faulty one.

One way to prevent such a waste of time is to thoroughly test each individual transistor before it is connected into the electrical circuit. Such testing is often a very tedious and time-consuming procedure, because when there are a substantial number of tests to be performed, the transistor must first be connected in a circuit in which certain bias voltages and currents are applied. Then, various voltages and currents must be measured and their values recorded. When another test is to be performed, the transistor must be disconnected from the first circuit and connected in a second circuit, which applies different bias voltages and currents to the transistor. Readings with the second circuit must then be made and recorded. When more and more tests are to be performed, the above procedure becomes very arduous and time consuming, since each transistor must be connected into and removed from a large number of test circuits.

In addition to transistorized computer circuits, other types of electronic circuits, such as those in the communications or measuring and testing fields, require transistors which meet very strict tolerances. It is imperative, therefore, that the transistor circuit designer, and in some cases the circuit user, be provided with a large amount of accurate data as to the various characteristics and parameters of each transistor used. This problem, of course, becomes most acute for the volume or mass user of transistors, such as in the computer application mentioned above.

It is, therefore, an object of the present invention to provide apparatus for rapidly, readily and accurately performing a large number of tests sequentially on a semiconductor device and for recording the results of the sequential tests in a convenient manner.

It is a further object of the present invention to provide a system which is able to subject a transistor to a large number of tests in a minimum amount of time, while the transistor being tested is located in a single socket throughout the entire test sequence, and to make a digital record of the results of each test. The entire testing operation is performed simply by inserting the transistor in a single test socket, programming the tests to be performed on program units, or modules, allowing the test sequence to be carried out, and removing the transistor from the test socket after the last test has been completed. The test results for each transistor tested are automatically recorded.

It is still a further object of the present invention to provide a system which is especially adapted to the mass testing of transistors and to recording the transistor performance data so that considerable time and labor may be saved when testing a large number of transistors.

It is a still further object of the present invention to provide a system for performing in sequence a large number of tests on transistors so that much more transistor performance information can be collected, conveniently categorized, and stored in a readily accessible manner than is possible under existing transistor testing methods.

It is a still further object of the present invention to provide a system for automatically performing preselected sequences of tests on transistors in which the test programmer is able to readily and rapidly set up the desired test conditions, and wherein the apparatus can be made either to automatically include or skip any particular test or sequence of tests.

It is a still further object of the present invention to provide a system for automatically furnishing sequences of appropriate D.C. biases, along with the necessary control and timing signals, for use in connection with external circuitry for making A.C. measurements, capacitance measurements, and pulse measurements on a semiconductor device.

In accordance with the objectives given above, the system provided by one embodiment of the present invention for automatically and sequentially performing a plurality of tests on a transistor includes a transistor-receiving socket for holding the transistor to be tested, programmable power supplies for furnishing electric biases for the transistor, a plurality of programming units each capable of controlling the power supplies to apply preselected biases required for a given test to the transistor, a sequence control device for sequentially activating each preselected programming unit to cause the sequential application of biases suitable for each preselected test to the transistor, means for measuring at least one preselected electrical quantity characterizing the transistor after each set of biases has been applied to the transistor, and means for recording the measured electrical quantities.

Other and further objects, advantages, and characteristic features of the present invention will become readily apparent from the following detailed description of preferred embodiments of the invention when taken in conjunction with the appended drawings in which.

Figure 1:
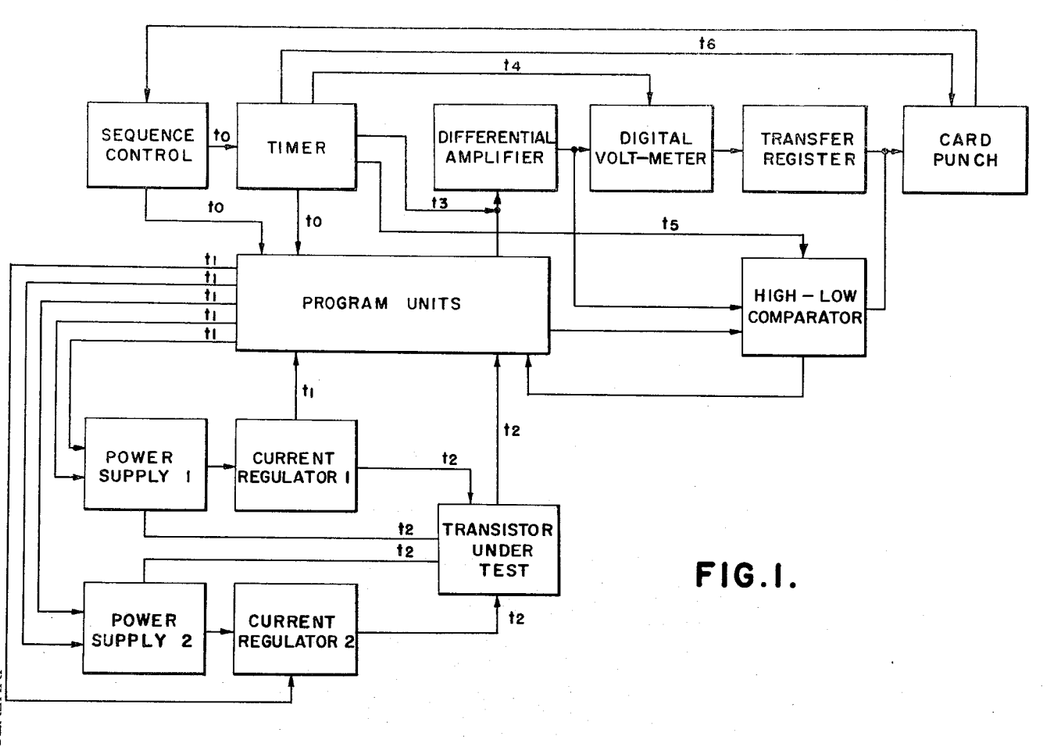
FIGURE 1 is a system block diagram of the transistor testing and recording mechanism provided by the present invention.

Referring to the block diagram of FIGURE 1, the preferred embodiment of automatic testing and recording system of the present invention is centered around a plurality of program units, one for each test to be performed. Thus, if it is necessary for 16 different transistor tests to be made, 16 program units are provided. Each program unit, or module, consists essentially of an arrangement of relays and potentiometers which apply preselected values of bias voltages and currents from power supplies to the transistor undergoing the test. Moreover, each program unit is provided with a control panel having potentiometer control dials so that the test programmer may set up in advance the magnitudes of supply voltages and currents necessary for the particular test associated with each program unit.

The program units are controlled by a Sequence Control. As best seen by reference to FIGURE 2, the Sequence Control includes a transistorized binary shift register having seventeen stages since sixteen program units are provided. As long as the system is not energized, each stage of the shift register will contain a "0." However, when the system is energized, a "1" is caused to occur in one particular stage of the shift register at a given time, with all the remaining stages containing "0's" the "1" being shifted from stage to stage on the occurrence of shift pulses. It should be readily apparent that the above designations of "1" and "0" are arbitrary, and may be reversed. The outputs from each of the first through the sixteenth stages of the shift register are connected via amplifiers to one of the sixteen program units. When a "1" is present in the first stage of the shift register, the first program unit is activated, and the system carries out the particular test which has been previously programmed into this unit. When a "1" is present in the second stage, the second program unit is activated and at this time the apparatus performs the test previously programmed on the second program unit. The third through the sixteenth shift register stages control the other program units in a similar manner. The seventeeth shift register stage is termed the "home" stage, and the output from this stage is applied via an amplifier to a "Home" Relay which will be discussed later.

A differential amplifier, having a gain of around 100, is connected via a readout network (not shown in FIGURE 1) to the socket which holds the transistor being tested, and the particular voltages or currents measured (as determined by the program unit governing the test in question) are applied to the differential amplifier. The output signals from the amplifier, which represent the test readings, are fed to a digital voltmeter, the output readings of which are applied through a decoding transfer register to a card punch device to record the readings on punch cards.

A High-Low Comparator is incorporated in the system to indicate when the transistor characteristics or parameters being measured do not lie within a preselected tolerance range. The maximum and minimum allowed values of a particular characteristic being tested are set up on the program unit as reference inputs to the High-Low Comparator. The measured value of this particular characteristic on the transistor being tested is sent to the High-Low Comparator from the differential amplifier. If the measured value is less than the minimum reference level, a low trip indication is sent to the program unit, and a command is sent to the card punch device causing a low trip indication to be recorded on the card. Similarly if the measured value is greater than the maximum reference value, a high trip signal is sent to the program unit, and a high trip command is sent to the card punch device causing it to record the fact that the maximum reference value has been exceeded.

A separate card is provided for each transistor tested so that the transistor user will have a readily available reservoir of information as to the various parameters and performance characteristics of each transistor. The user may thus be able to tell by a glance at the card whether a given transistor is suited for a particular use, or, if it is necessary for several transistors having nearly identical performance characteristics to be used in a given situation, the user may scan through several cards and select the transistors having the desired characteristics.

A Timer is provided to generate timing pulses for the various phases of the testing and recording operations. When a "1" is set up in a particular stage of the Sequence Control shift register, which indicates that the test associated with that stage is to be initiated, a signal is sent to the Timer. After a slight delay due to the closing of certain relays, the power supply command levels previously programmed on the particular program unit governing the test to be performed are applied to the power supplies. After a further delay, due to a greater time constant inherent in the closing of certain other relays, the transistor being tested is connected to preselected bias-supplying output terminals on the power supplies, and at the same time preselected transistor terminals are connected across the readout network. After a predetermined delay to prevent transients from overloading the differential amplifier, the Timer generates a command signal to close relays which connect the output of the readout network to the input of the differential amplifier. After a further programmable variable delay to allow the power supply voltages, the differential amplifier and the voltmeter to stabilize at the measure value, the Timer generates a further command signal which is applied to three sets of relays, each having different time constants. The fastest operating set of relays sends a signal to the digital voltmeter causing it to read the differential amplifier output, and to also apply the amplifier output to the High-Low Comparator. A short time later, when the next fastest operating relays are closed, the High-Low Comparator output is fed to the program unit High-Low Trip indicator and to the card punch device. After a further delay, due to the greater time constant of the slowest closing set of relays, a command pulse is sent to the card punch to cause the voltmeter reading and the High-Low Comparator results to be punched on the card. The data is recorded on the card in three-digit readings, and when the recording of information in the final position is initiated, a signal is sent to the Sequence Control to shift the "1" to the next stage of the shift register.

Figure 2:
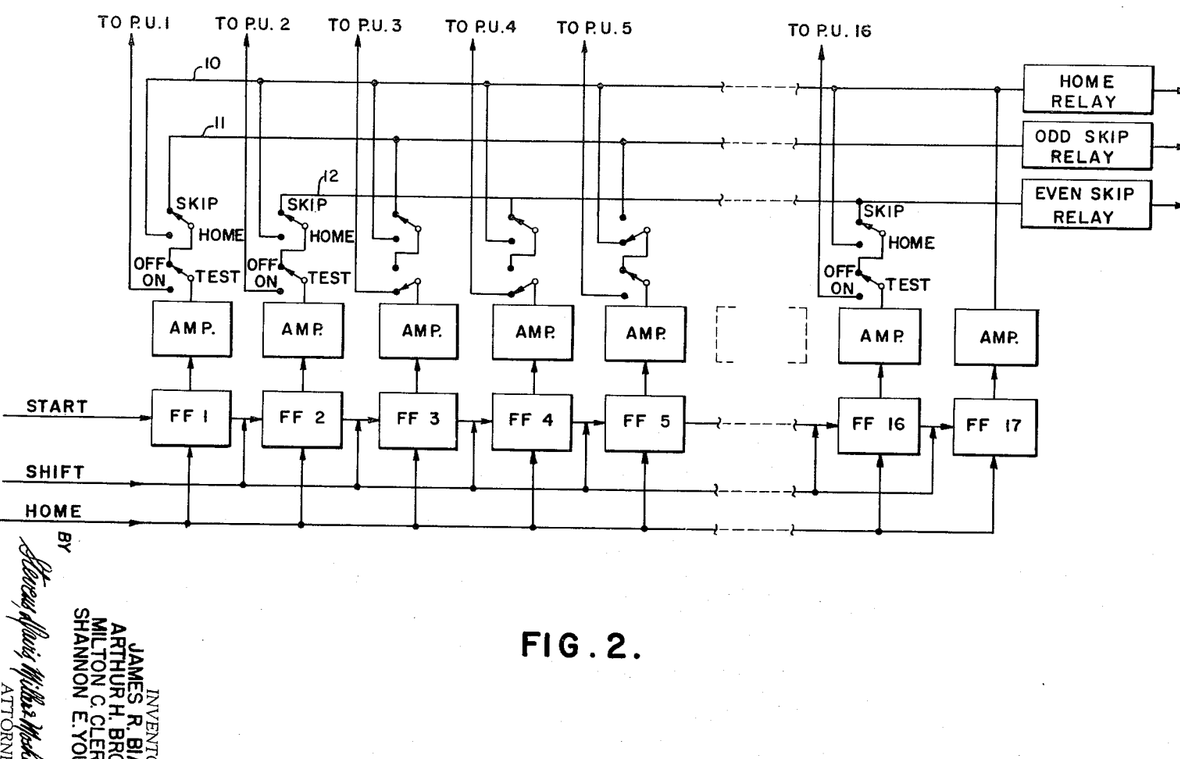
FIGURE 2 is a block diagram showing the essential elements of the Sequence Control block of FIGURE 1.

FIGURE 2 illustrates in more detail the elements constituting the block labeled Sequence Control in FIGURE 1. The Sequence Control includes a conventional 17-stage shift register, each stage comprising a transistor flip-flop circuit FF and the gates necessary to cause the contents of each flip-flop to shift to the next succeeding flip-flop on the occurrence of a shift pulse. The output of each flip-flop is fed to an amplifier AMP, and the outputs of the first through sixteenth amplifiers are connected via "Test" and "Home-Skip" switches to program units PU one through sixteen, respectively. The "Test" and "Home-Skip" switches are two-position switches located on the control panel for the Sequence Control unit, a pair of such switches being provided for each program unit. Each "Test" switch has positions designated "On" and "Off," and governs whether or not the particular test controlled by its associated program unit is to be performed. Each "Home-Skip" switch determines whether the particular test controlled by its associated program unit is to be skipped, or whether no further tests are to be performed in the sequence and the shift register is to be "homed."

As is illustrated in FIGURE 2, the output from each flip-flop amplifier is fed to a "Test" switch. The "On" side of the "Test" switch is connected to the program unit associated with that particular flip-flop, while the "Off" side of each "Test" switch is connected in series with a "Home-Skip" switch. The "Home" side of this switch is connected to a line 10 which feeds a "Home" Relay. The "Skip" side of each "Home-Skip" switch for the odd-numbered flip-flops is connected to a line 11 which feeds an Odd Skip Relay, while the "Skip" terminal of each "Home-Skip" switch for the even-numbered flip-flops is connected to a line 12 which feeds an Even Skip Relay. Two skip relays are necessary because if only one relay were provided, it would be impossible to skip two or more successive tests since the switching speed of the shift register is too fast to permit the relay to release and provide the second skip pulse.

The apparatus of FIGURE 2 is drawn to illustrate a sample Sequence Control sequence in which the first two tests are to be skipped, the third and fourth tests are to be performed, and the Sequence Control is to be "homed" after the fourth test, i.e. the fifth through the sixteenth tests are not to be performed. The test sequence is initiated by pressing a "Start" button on the Sequence Control panel (not shown), which sends a "Start" signal to flip-flop 1 to set this flip-flop to the "1" state. A signal is then set to the associated amplifier, and the amplifier output passes to the "Test" switch associated with flip-flop 1. Since this "Test" switch is in the "Off" position, no signal will be sent to the first program unit, and this program unit will not be connected to the power supplies. Instead, the output signal from the amplifier will pass through the "Home-Skip" switch, and since this switch is connected in the "Skip" position, a signal will be applied via line 11 to the Odd Skip Relay. The Odd Skip Relay sends a signal to the card punch to make no recording on that portion of the card which is normally allotted to receive the results of the test from the first program unit, and to move the card into a position with respect to the card punch in which the portion of the card allotted to receive the test results from the second program unit is adjacent the recording elements.

The card punch then sends a shift signal to the Sequence Control, causing the contents of each stage of the shift register to be shifted to the next succeeding stage. This shifts the "1" from flip-flop 1 to flip-flop 2. Since the "Test" switch associated with flip-flop 2 is in the "Off" position, the second test will not be performed. Moreover, since the "Home-Skip" switch associated with flip-flop 2 is in the "Skip" position, the output signal from the amplifier associated with flip-flop 2 will pass via line 12 to Even Skip Relay, energizing the Even Skip Relay to send a signal to the card punch to move the card relative to the card punch device into the proper position to receive recordings of the third test.

A shift pulse is then sent to the Sequence Control to shift the "1" from flip-flop 2 to flip-flop 3. Since the "Test" switch associated with flip-flop 3 is in the "On" position, the occurrence of a "1" in this flip-flop will send a signal to program unit 3, with no signals being sent to the "Home" or "Skip" Relays. The application of a signal to program unit 3 causes the test programmed on this program unit to be performed. The timing sequence indicated above, starting with connecting the power supply level controls on program unit 3 to the power supplies will be carried out, the Timer being energized when the above-mentioned signal is applied to program unit 3 so that the necessary timing pulses will be available to carry out a complete testing and recording operation for test number 3. When the third test is about to be completed, i.e. when the third digit for this test is being punched on the card, a shift signal is sent to the Sequence Control, the "1" then being shifted from flip-flop 3 to flip-flop 4. The test programmed on the fourth program unit is then carried out in the same manner as test number 3, and after this test is completed the shift pulse will shift the "1" from flip-flop 4 to flip-flop 5.

Since the test switch for flip-flop 5 is in the "Off" position and the "Home-Skip" switch is connected to the "Home" terminal, the output signal from flip-flop 5 will be applied via the line 10 to the "Home" Relay, which "homes" the shift register, i.e. generates a "Home" pulse which sets every stage of the shift register to "0." The shift register may also be "homed" in another manner. If the sixteenth test is to be performed, upon completion of this test, a shift pulse is generated to shift the "1" from flip-flop 16 to flip-flop 17. When flip-flop 17 contains a "1," a signal is applied through its amplifier directly to the "Home" Relay, which "homes" the shift register in the manner described above. When the shift register is thus "homed," either because of a "Home" switch setting or after the sixteenth test has been performed, the punch card for the particular transistor being tested is removed automatically from the card punch, and a new card is inserted into the card punch device. The transistor being tested may now be removed from the test socket, and the next transistor to be tested is inserted in its place. The system is now ready for the test sequence to be performed on the new transistor, the test sequence being initiated upon the reactivation of the "Start" button.

Figure 3:
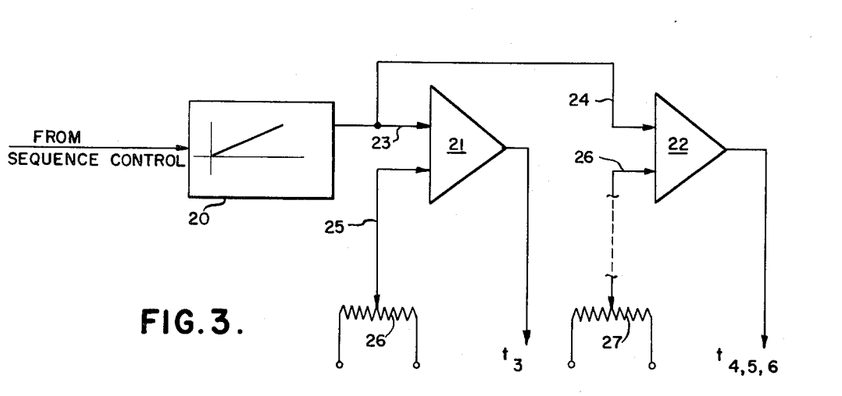
FIGURE 3 is a block and circuit diagram illustrating the essential elements of the Timer block of FIGURE 1.
Figure 5:
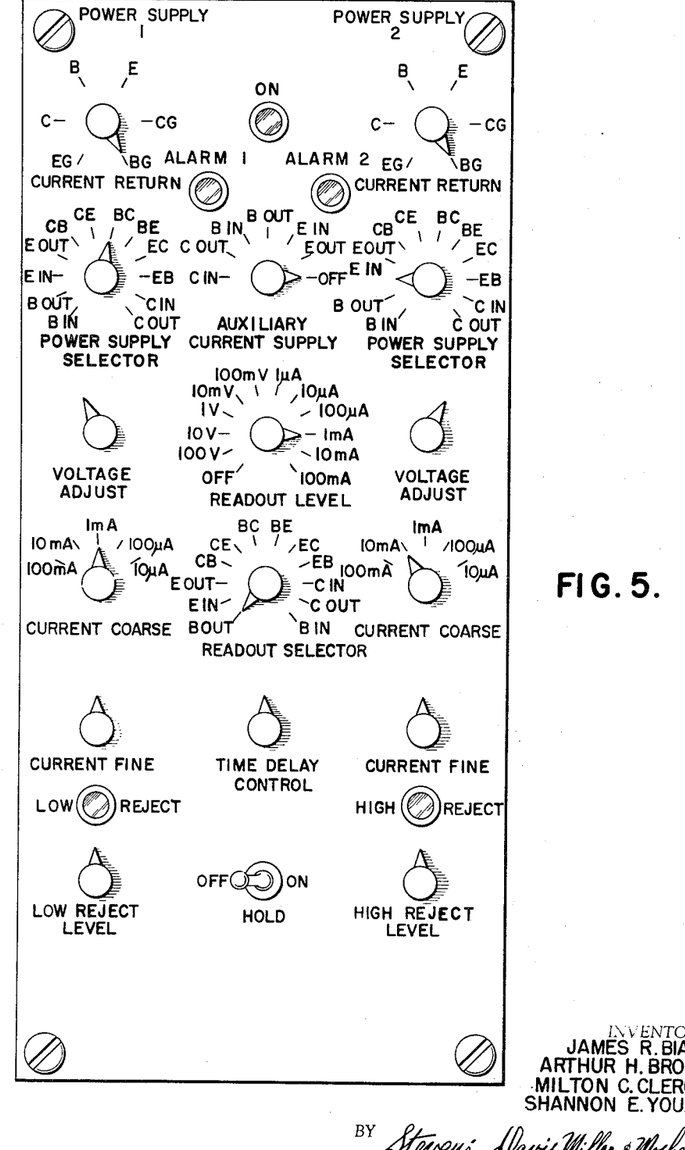
FIGURE 5 is a pictorial representation of the control panel of a program unit.

FIGURE 3 illustrates the essential elements which comprise the Timer, namely a ramp voltage generator 20 and a pair of comparator amplifiers 21 and 22. The input to the ramp generator 20 is the test initiating signal from the Sequence Control, which is generated upon the activation of any program unit. The output of the generator 20 is fed to one input 23 of the comparator 21 and one input 24 of the comparator 22. The second input 25 of the comparator 21 is fed from a tap on a potentiometer 28 which varies the magnitude of the voltage applied to the input 25 to vary the voltage necessary to trigger the comparator 21. Similarly, the second input 26 to the comparator 22 is connected to a tap on a potentiometer 27 to vary the magnitude of the reference voltage applied to the comparator 22 to set the comparator 22 to trigger at a particular value of ramp voltage on the lead 24. It should be pointed out that whereas only a single potentiometer 28 is provided, a plurality of potentiometers 27 are provided, one for each program unit. The knobs which control the potentiometers 27 are located on the respective program unit control panels. One such potentiometer control knob is shown in FIGURE 5 and is designated as Time Delay Control. The particular potentiometer 27 associated with the program unit governing the test presently being carried out is the one connected to the Timer.

The timing sequence for the system will now be given. The moment when a shift pulse is applied to the Sequence Control will be designated as $t_0$, and if a given test is to be performed, a signal will be sent through the "Test" switch associated with the particular flip-flop containing a "1" a very short time after $t_0$. This signal will be sent to the particular program unit associated with this flip-flop as well as to the Timer. When the signal is applied to the Timer, the ramp generator 20 is triggered, and a ramp voltage appears on its output leads 23 and 24. The signal sent to the program unit closes relays which connect the power supply levels programmed on the program unit to the power supplies. (The power supply levels have been previously set up on voltage adjustment potentiometers and on coarse and fine current adjustment potentiometers located on the program units.) The relays which connect these program unit potentiometers to the power supplies require a given time to close, this delay being of the order of 25 ms. after activation of the relays at $t_0$. The time when the relays close, i.e., when the program unit command levels are applied to the power supplies, is designated as $t_1$.

At the same time the above-mentioned relays are energized, a signal is applied to close additional relays to connect the power supply outputs, through the program unit governing the test being performed, to preselected terminals of the transistor being tested and to also connect preselected terminals of the transistor to the readout network. However, since the inherent time constant of this second set of relays is approximately 15 ms. longer than that of the first set of relays, the power supplies will not be connected to the transistor until about 15 ms. after $t_1$, this later time being designated as $t_2$.

Returning now to the description of the Timer, as long as the ramp voltage on the lead 23 is less than the reference voltage on the lead 25 applied to the comparator amplifier 21, there will be no output from the comparator 21. However, when the ramp voltage increases to the point where it equals the voltage on the lead 25, the comparator 21 will generate an output. The time when this occurs is designated as $t_3$, and the output signal thus generated closes relays which connect the output of the readout network to the input to the differential amplifier. The time at which the comparator 21 is triggered to generate an output signal is determined by the magnitude of the voltage applied via the lead 25; hence $t_3$ may be regulated by varying the tap on the potentiometer 28. The delay before $t_3$ is necessary to avoid paralysis of the differential amplifier caused by switching transients.

Similarly, as long as the voltage on the lead 26 to the comparator 22 is greater than the ramp voltage on the lead 24, no output signal will be generated by the comparator circuit 22. However, when the ramp voltage on the lead 24 becomes equal to the reference voltage on the lead 26, the comparator 22 will generate an output signal designated as $t_{4,5,6}$. The time at which this output occurs is controlled by the setting of the tap on the potentiometer 27 on the particular program unit governing the test being performed, and this time is made to occur at a later time than $t_3$. In fact, the $t_{4,5,6}$ output signal is generated anywhere from 150 ms. to 10 seconds after $t_2$.

The $t_{4,5,6}$ output signal closes three sets of relays, each having different time constants. The closure of the fastest operating relays occurs at $t_4$, and at this time a trigger signal is sent to the digital voltmeter causing it to read the differential amplifier output.

Due to their inherent nature, the second set of relays requires a longer time to close after the onset of the $t_{4,5,6}$ signal, and these relays will not close until $t_5$. This second set of relays connects the High-Low Comparator circuit output with the High and Low Trip indicators on the program unit control panel as well as with the card punch device. Thus, at $t_5$ the results of the high and low comparisons (which were initiated at $t_3$ when the readout network was connected to the differential amplifier input) will be sent to the High and Low Trip indicator lights on the program unit panel to provide an indication in the event the measured quantity is below the minimum tolerance level or above the maximum allowed value. Also, at $t_5$ the High-Low Comparator results are sent to the card punch.

The slowest closing set of relays energized by the onset of the $t_{4,5,6}$ signal sends a command to the card punch to record the digital voltmeter reading on the punch card. This occurs at $t_6$.

The data is recorded in three digit readings on the punch card. When the recording of the third and final digit is initiated, the card punch sends a signal to the Sequence Control to generate a shift pulse which will initiate the next test.

The minimum time required for a single testing and recording operation is normally of the order of 450 milliseconds; hence, when all 16 tests are to be performed on a given transistor, the total test time for an entire sequence would be less than 8 seconds. The time required to complete a given test will, of course, vary with the setting of the Time Delay Control knob on the control panel of the associated program unit (see FIGURE 5), which controls the position of the tap on the potentiometer 27. This sets the time when the comparator 22 is triggered to anywhere from 150 ms. to 10 seconds after $t_2$. In the event more than 10 seconds are needed for any test, the Hold toggle switch located immediately below the Time Delay Control knob on the program unit control panel (FIGURE 5) is moved from the "Off" to the "On" position. This will delay the occurrence of the $t_{4,5,6}$ signal indefinitely, or until after the Hold toggle switch is returned to the "Off" position.

It should also be apparent that the timing may be controlled by varying the slope of the ramp voltage produced by the generator 20.

Figure 4:
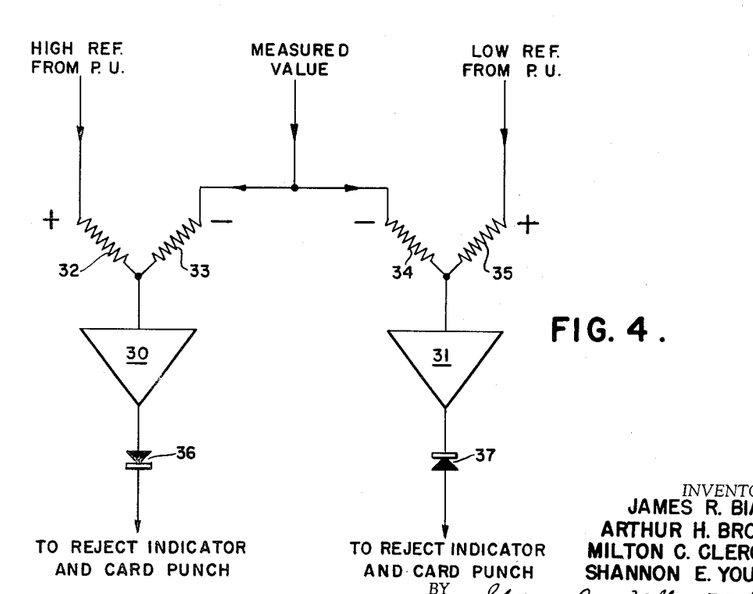
FIGURE 4 is a diagram which shows the essential portions of the High-Low Comparator block of FIGURE 1.

The High-Low Comparator is illustrated in FIGURE 4 and consists essentially of a pair of summing amplifiers 30 and 31. A high, or maximum allowable, reference value is fed from the program unit to a resistor 32 which affords one input to the summing amplifier 30. The measured value from the transistor being tested (which actually is taken from the output of the differential amplifier) is applied to a resistor 33 which provides the other input to the summing amplifier 30 so that the measured value is subtracted from the high reference level. Similarly, the low, or minimum reference value, is applied from the program unit to a resistor 35 which provides one input to the summing amplifier 31, and the measured value is applied to a resistor 34 which affords the second input to the amplifier 31 so that the measured value is subtracted from the minimum reference level. Each summing amplifier introduces 180° of phase shift, so that if the measured value is less than the reference value the outputs of the summing amplifiers will be negative, whereas if the measured value exceeds the reference value the amplifier outputs will be positive. A positive output from the summing amplifier 30 (which means that the measured value exceeds the maximum reference level) will send a signal to the program unit to energize the High Reject Indicator light on its control panel (see FIGURE 5) and will also send a signal to the card punch device to punch a high reject indication on the card. A negative output from the amplifier 30 will have no effect. A positive output from the summing amplifier 31 will means that the measured value exceeds the minimum reference level and will have no effect, while a negative output from the summing amplifier 31, indicating that the measured value is below the minimum reference level, will send a signal to the Low Reject Indicator light on the program unit control panel (FIGURE 5), and will also cause a low reject indication to be recorded on the punch card. The use of a positive output from the summing amplifier 30 and a negative output from the summing amplifier 31 to indicate rejects is accomplished by connecting a diode 36 to the output of the amplifier 30 in such polarity that only positive signals will be passed, and by connecting a diode 37 to the output of the amplifier 31 in a sense which will pass only negative signals.

Electrical energy for obtaining the desired biases for the transistor undergoing the test is obtained from two programmable power supplies and two current regulators. The power supplies and regulators are connected so that two independent voltages (designated as $V_1$ and $V_2$), two independent currents ($I_1$ and $I_2$), or one independent voltage and one independent current may be provided. The voltage or current levels for each power supply are controlled by potentiometer dials on the program unit control panels, the dials being pre-set to desired positions before the transistor is inserted into the test socket. Each program unit is provided with two voltage adjustment potentiometers, two coarse current switches, and two fine current potentiometers, one set for each power supply (see FIGURES 5 and 7). In a preferred embodiment the power supplies are programmable from 0.1 volt to 100 volts, with regulation better than 0.15% against line variations from 105–125 volts, or with load variations from no load to full load.

The current regulators may be used in conjunction with the power supplies to cause said power supplies to give particular current outputs. When used in this manner, the power supply-current regulators preferably are able to provide currents of a magnitude from 50 μa. to 100 ma. with a current regulation better than 0.5% for load variations from normal loading to short circuit condition. In addition, one of the current regulators may be used in an alternate manner to prevent current flow in a particular transistor connection from exceeding a predetermined value. This function will be discussed later.

The power supply potentiometers, which have been preset on each program unit according to the test to be performed on that program unit, are connected to the power supplies at time $t_1$. The outputs from the power supplies are connected to the transistor undergoing the test at time $t_2$. Switches designating the particular terminals of the transistor undergoing the test which are to receive the power supply biases are pre-set to their proper positions before the actual testing is initiated. These switches are located on the program unit control panels and include a 12-position Power Supply Selector switch and a 6-position Current Return switch (see FIGURE 5). Two sets of these switches are provided on each program unit, one set for each power supply. The selector and current return switches determine what terminals of the transistor are connected to what terminals of the power supplies (and in what manner); and their operation will be discussed in more detail later.

The measurement signals from the transistor being tested are fed to a differential amplifier whose function is to amplify the signals to a level sufficient for the measuring circuitry to obtain accurate readings.

The differential amplifier may be of conventional type, and for this reason, it will not be discussed in detail. It should suffice to state that it is preferred to use an amplifier having a gain of around 100, with a maximum readout of 1.0 volt. In a preferred embodiment a "Kintel" Model 114A differential amplifier is employed, although it should be understood that other amplifiers may be used without departing from the scope of the invention.

Figure 8:
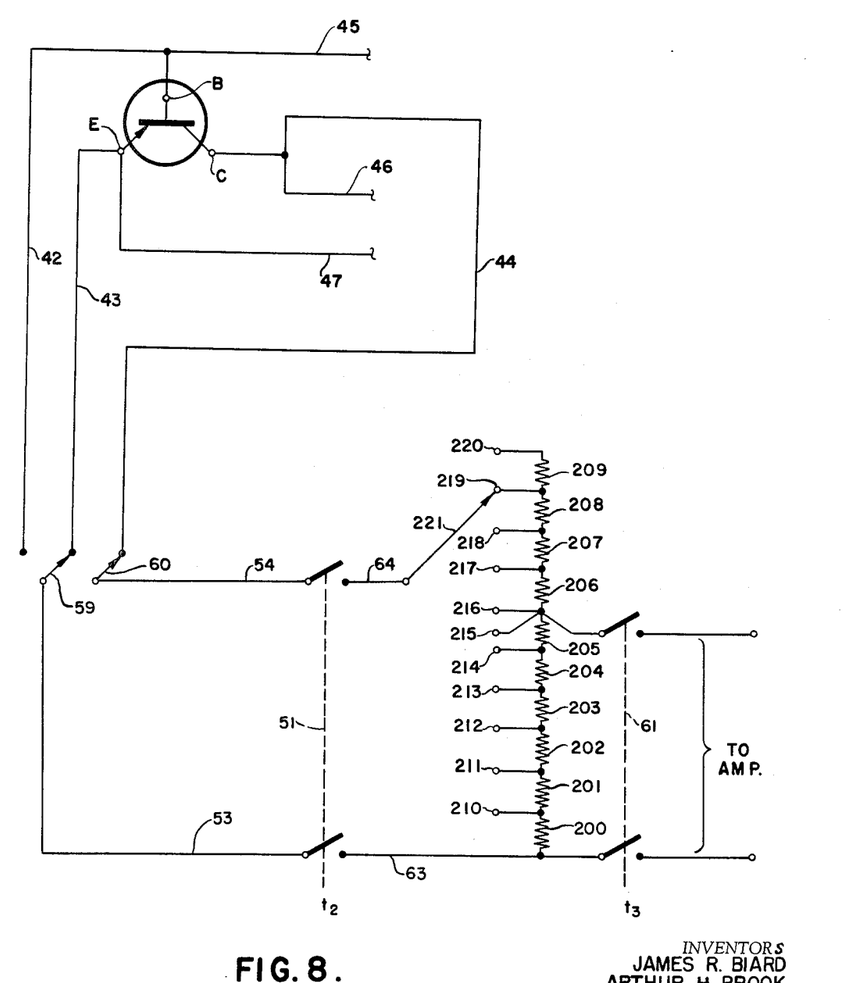
FIGURE 8 is a schematic circuit diagram showing the readout connections from the transistor being tested to the readout amplifier for an exemplary test, namely $BV_{CEX}$; while FIGURES 9 ($a$–$k$) are simplified schematic circuit diagrams showing programming connections for a plurality of exemplary tests which may be performed on a transistor with the apparatus of the present invention.
Figure 9A:
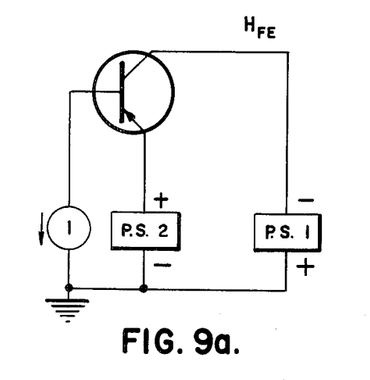
Figure 9B:
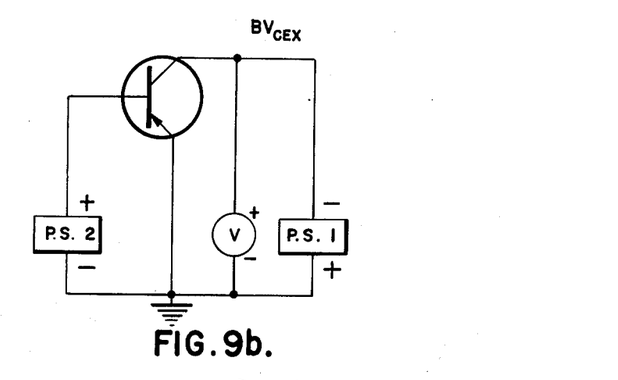
Figure 9C:
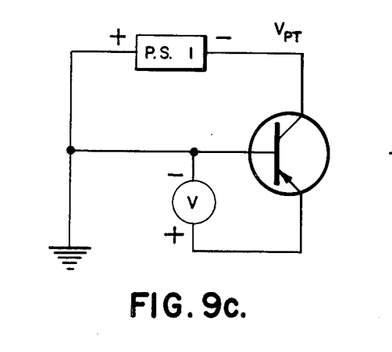
Figure 9D:
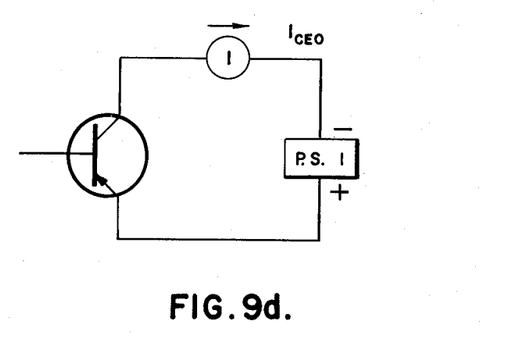
Figure 9E:
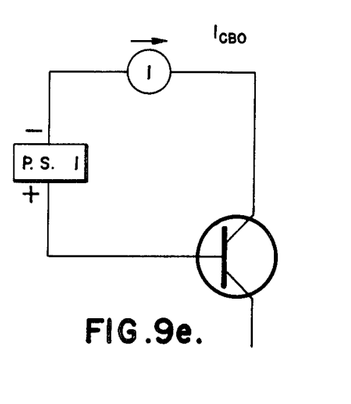
Figure 9F:
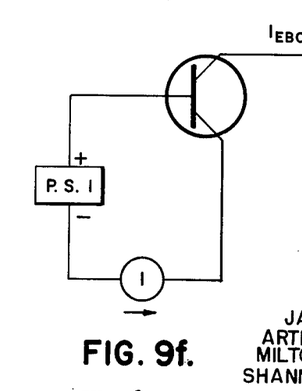
Figure 9G:
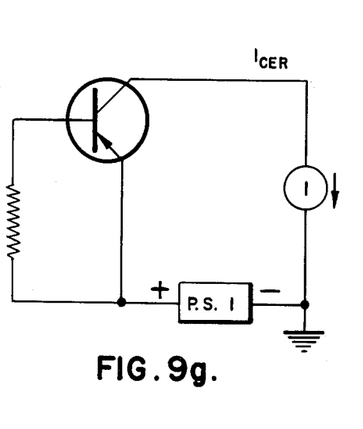
Figure 9H:
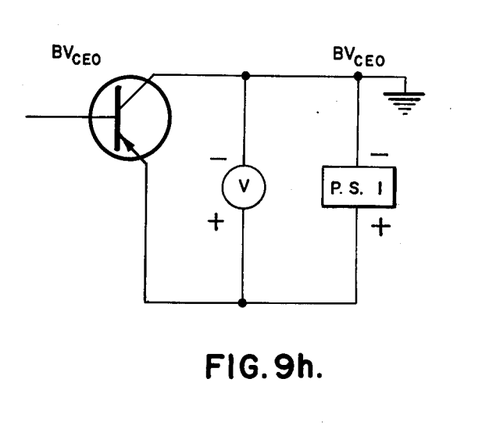
Figure 9I:
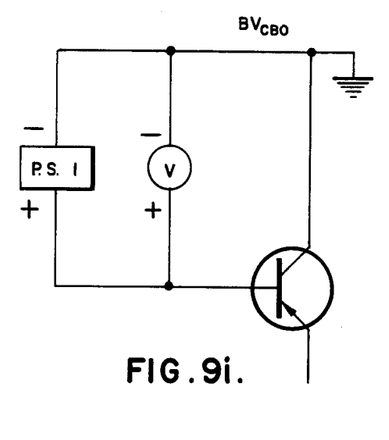
Figure 9J:
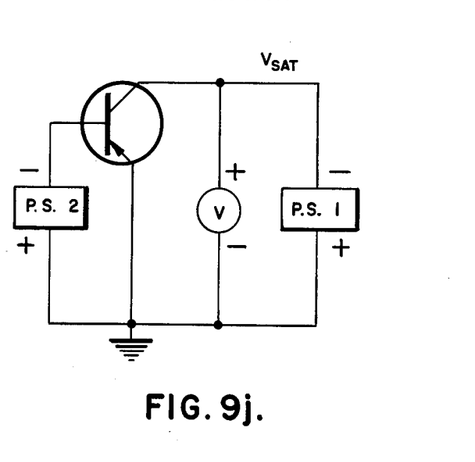
Figure 9K:
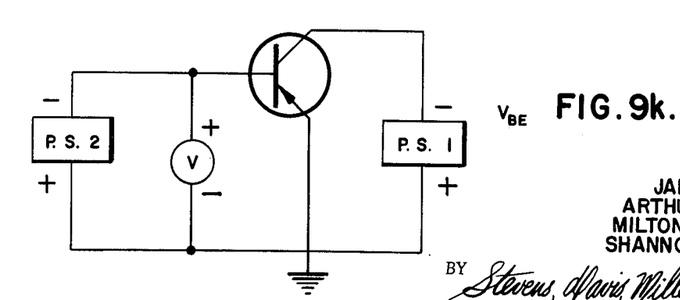

Connections from the transistor undergoing the test to the differential amplifier are afforded through a readout network (shown in FIGURE 8). The particular transistor terminals to be connected to the readout network input are determined by the setting of the Readout Selector switch on each program unit control panel. The voltage or current range to be measured is determined by the Readout Level switch on each program unit control panel (see FIGURE 5).

The digital voltmeter is preferably of a type such as "Franklin" Model 1310N, although other similar meters may be used equally well. The voltmeter provides 3-digit readings in binary coded decimal with an accuracy of around 0.1%. Also, a visual readout is provided in the event the information is not to be recorded on the cards.

The output signal from the digital voltmeter is sent via a transfer register to a card punch, which may be, for example, an "IBM" 526 Summary Punch, a "Friden" motorized tape punch, or any other similar recording device for recording digital data on punch cards or tape. The transfer register is a conventional binary signal decoding matrix, or tree, and is necessary to convert the binary coded decimal output of the digital voltmeter to the decimal indications required by the input to the card punch.

An item counter is included in the card punch device to count the number of transistors tested, the number assigned to each transistor being recorded on the card associated with that particular transistor. In a preferred embodiment of the present invention, three-column decimal readings are made. A separate space on the card is allotted to each of the sixteen tests. Space is also allotted in the third, or least significant, digit column to receive a high or low reject indication.

Figure 6:
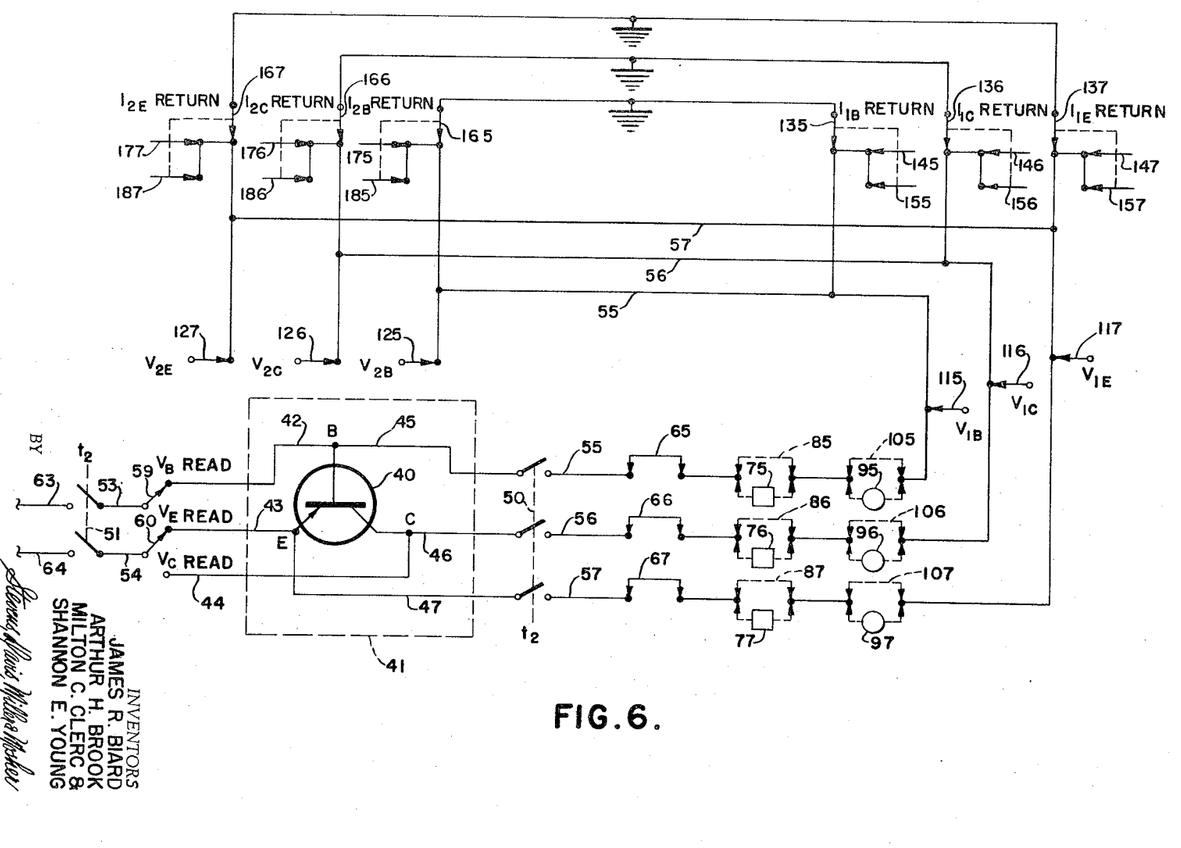
FIGURE 6 is a schematic circuit diagram showing program unit connections to a transistor located in the test socket.

FIGURE 6 is a schematic circuit diagram illustrating how the terminals of the transistor undergoing the test are connected to the Power Supply Selector and Current Return switches on the program units. The transistor being tested is indicated by the numeral 40 in FIGURE 6, and is shown mounted in a 3-terminal transistor-receiving socket indicated generally by that portion of the circuit enclosed within the dotted line 41. Leads to the emitter, base and collector electrodes of the transistor are connected to the terminals of the transistor-receiving socket 41 designated as E, B and C, respectively. A pair of leads is connected to each of the terminals E, B and C, one of the leads in each pair serving to read out the voltage measurements for the transistor, and the other lead in each pair being used to apply the preselected biases to the transistor 40 undergoing the test and for reading out the current measurements. In FIGURE 6 the leads 42, 43 and 44 are the voltage readout leads for the base, emitter and collector, respectively; while the wires 45, 46 and 47 form the current readout and bias-applying leads for the base, collector and emitter, respectively. The six transistor leads 42–47 on the transistor-receiving socket are connected to each program unit, with relays 50 and 51 controlling their connection to the power supply and readout circuits. The relay 50 connects the base, collector and emitter leads 45, 46 and 47 to the program unit leads 55, 56 and 57, respectively. Similarly, the relay 51 connects the readout leads 63 and 64 to the leads 53 and 54 which in turn are connected by means of Readout Selector switch arms 59 and 60 to two of the three transistor leads 42, 43 and 44. In FIGURE 6, the Readout Selector switch is shown with arm 59 connected to the base and arm 60 connected to the emitter of the transistor 40. This corresponds to a setting of the Readout Selector switch on the program unit control panel (FIGURE 5) to the EB position, i.e. the voltage from the emitter to the base (in a positive sense) will be read out.

The program unit leads 55, 56 and 57 may be provided with jumpers 65, 66 and 67, respectively, to afford any desired resistance in the base, collector and emitter paths. In FIGURE 6, the numerals 65, 66 and 67 designate short circuits; however, when certain tests are performed, one or more of the short circuits may be replaced by resistors of desired values. Also, the jumpers allow for connection of a resistor or a short circuit between any two of the leads 55, 56 and 57. An auxiliary current regulator 75, 76 or 77 may be connected in series with one of the lines 55, 56 or 57, respectively. The current regulator 75, 76 or 77 serves the function of limiting the current in its lead 55, 56 or 57 to a particular value, thus preventing the transistor 40 undergoing the test from becoming permanently damaged in the event of a short circuit. The current regulator normally used in conjunction with Power Supply 1 for furnishing bias currents to the transistor 40 may be used as the auxiliary current regulator. It is important to note, however, that this may be done only when Power Supply 1 is used as a voltage supply. When an auxiliary current regulator is not connected in the circuit, short circuit bars 85, 86 or 87 are connected in its stead.

When current measurements are to be made, a device 95, 96 or 97, which serves as an ammeter, is connected into one of the circuits 55, 56 or 57. Although the devices 95, 96 and 97 are shown as ammeters in FIGURE 6, these devices are in reality the readout network (FIGURE 8) connected so as to measure current. This will be discussed in more detail later when the circuit of FIGURE 8 is described. For the present it should suffice to say that, obviously, only one ammeter device 95, 96 or 97 will be connected in the program unit circuit at any given time. When an ammeter is not connected in one of the circuits 55, 56 and 57, short circuit bars 105, 106 or 107 are connected in its place.

The voltage biases from Power Supply No. 1 may be connected to the base, collector and emitter leads 55, 56 and 57 by means of switch arms 115, 116 and 117, respectively, while voltage biases from Power Supply No. 2 may be connected to the respective leads by means of switch arms 125, 126 and 127, respectively, FIG. 6. The switch arms 125, 126 and 127 for Power Supply No. 2 are controlled by the Power Supply Selector switch on the right side of the program unit control panel (see FIGURE 5), while the switch arms 115, 116 and 117 are controlled by the Power Supply Selector switch for Power Supply No. 1, which is located on the left side of the control panel.

Each of the leads 55, 56 and 57 is provided with two Current Return Selector switch arrays, one for each power supply. For example, the emitter lead 57 is connected to a ground switch arm 137 and power supply switch arms 147 and 157 for Power Supply No. 1, as well as to a ground switch arm 167 and power supply switch arms 177 and 187 for Power Supply No. 2. Identical arrays of switch arms are connected from each power supply to the base and collector leads 55 and 56, respectively. The positions of these switch arms are controlled by the Current Return Selector switches for Power Supply No. 1 and for Power Supply No. 2 on the program unit control panel.

Figure 7:
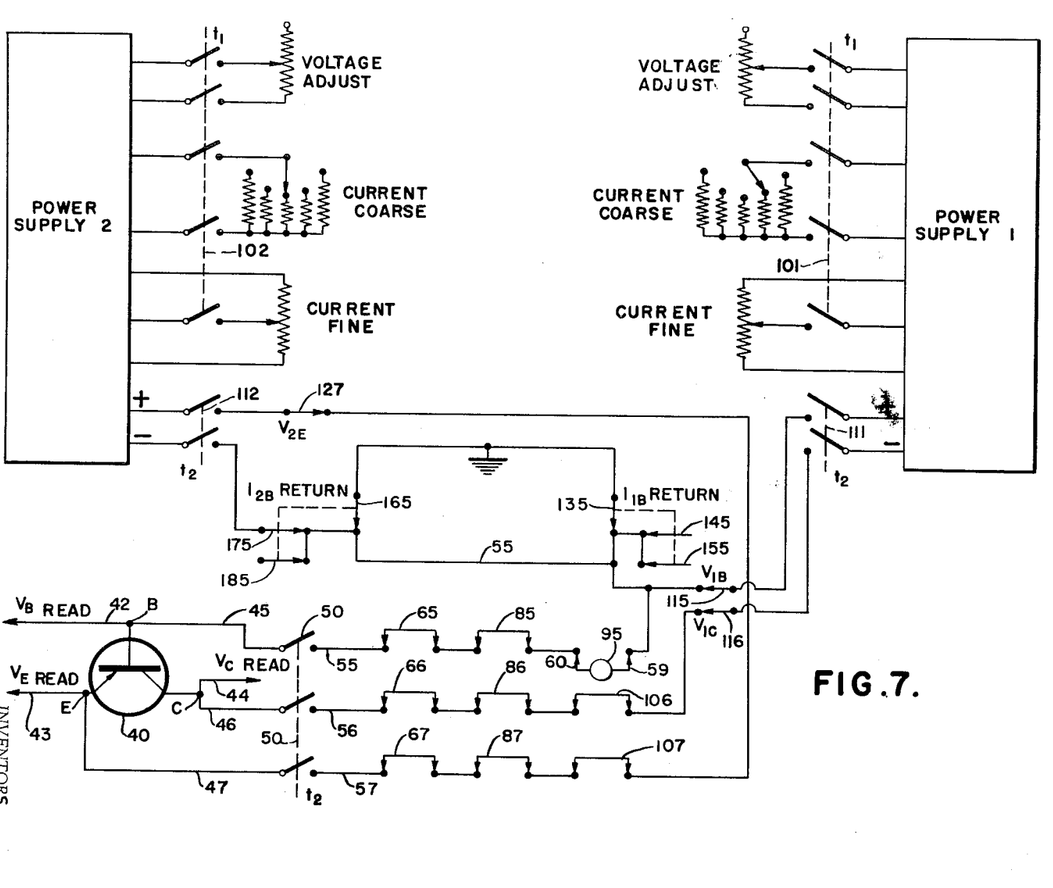
FIGURE 7 is a schematic circuit diagram which illustrates connections from the programmable bias supplies through the programming unit circuitry to the transistor undergoing the test for an exemplary test, namely $h_{FE}$.

FIGURE 7 is a circuit diagram illustrating the program unit circuit connections for a particular exemplary test, namely $h_{FE}$. As has been mentioned above, the power output levels for each power supply are programmed by means of a voltage adjusting potentiometer, a coarse current switch and a fine current potentiometer, located on the program units. The respective potentiometers for Power Supply No. 1 are controlled by the Voltage Adjust knob, the Coarse Current switch and the Fine Current adjustment knob located on the left side of the program unit control panel (FIG. 5), while the potentiometers for Power Supply No. 2 are controlled by identical knobs on the right side of the panel. As is shown in FIGURE 7, the power level programming potentiometers for Power Supply No. 1 are connected to this power supply by means of a relay 101 at time $t_1$, and similarly, the power level controlling potentiometers for Power Supply No. 2 are connected to Power Supply No. 2 by means of a relay 102 at $t_1$.

In programming the $h_{FE}$ test on a program unit, the Power Supply Selector and Current Return selector switches for each power supply are pre-set on this program unit according to the particular bias conditions required for the $h_{FE}$ test. In order to test for $h_{FE}$, Power Supply No. 1 is connected to apply a negative bias voltage between the collector and base, Power Supply No. 2 is connected to feed a bias current into the emitter, and a current measuring circuit is connected to read current out of the base terminal. Therefore, in programming the $h_{FE}$ test, the Power Supply Selector switch for Power Supply No. 1 is turned to the BC position. In this connection it should be noted that in FIGURE 5 the first letter (E, B or C) of each pair designates the positive terminal. This closes switch arms 115 and 116 to apply the positive output terminal of Power Supply No. 1 to the base lead 55 and the negative output terminal on Power Supply No. 1 to the collector lead 56. Thus, Power Supply No. 1 is operated as a voltage source. Power Supply No. 2, on the other hand, is operated as a current source, and the Power Supply Selector switch for this power supply is set to the $E_{in}$ position. This connects the positive output terminal on Power Supply No. 2 to the emitter lead 57 by means of switch arm 127. The Current Return switch for Power Supply No. 2 is set to the BG position, which closes switch arms 175 and 165 to connect both the negative terminal of Power Supply No. 2 and the base lead 55 to ground. The Current Return switch for Power Supply No. 1 is also set to the BG position to ground the base lead 55 through the switch arm 135 on the base current return switch for Power Supply No. 1.

For the $h_{FE}$ test, the current flowing out of the base is to be measured; hence the Readout Selector switch on the program unit control panel is set to the $B_{out}$ position. This connects the readout network (FIGURE 8) as an ammeter 95 in the base lead 55 in such polarity that current flowing out of the base will give a positive reading on the meter. The positive side of the readout network is connected to the side of the lead 55 nearest the transistor 40 by means of the switch arm 60 (FIGURES 6 and 7), whereas the negative side of the readout network is connected via switch arm 59 to the grounded side of the lead 55.

Since no readings are to be made in the collector or emitter circuits, the setting of the Readout Selector switch to the $B_{out}$ position causes short circuit bars 106 and 107 to be connected across the points on the leads 56 and 57, respectively, adapted to receive the readout network. Since no auxiliary current regulator is to be used for this test, the Auxiliary Current Supply knob on the program unit control panel is set to the "Off" position. This causes short circuits 85, 86 and 87 to be connected into the leads 55, 56 and 57, respectively, in place of any auxiliary current regulator. Moreover, since no external resistors are to be connected in the base, collector or emitter circuits, short circuit jumpers 65, 66 and 67 are connected to the leads 55, 56 and 57, respectively, on the rear panel of the control unit. The Readout Level Switch on the program unit control panel is shown as set to the 1 ma. position. This designates what the full scale reading of the current readout network 95 will be, as will be discussed in more detail later with reference to FIGURE 8.

The High and Low Reject Level knobs on the program unit control panel are set for the desired high and low reject values, and the program unit sends the corresponding high and low reference signals to the High-Low Comparator. During the test, if the transistor parameter being tested exceeds the high reject level, the High Reject light will be lit; and similarly, if the parameter is below the low reject level, the Low Reject light will be made to light.

It should be emphasized again that the switches on the program unit are set prior to the initiation of the test sequence. During the actual test sequence, the voltage adjustment potentiometers, the coarse current switches and fine current potentiometers are connected to the power supplies at time $t_1$. Then, at time $t_2$, Power Supply No. 1 will be connected to the appropriate program unit connections shown in FIGURE 7 by means of a relay 111, and Power Supply No. 2 will be connected to the appropriate program unit terminals by means of relay 112. Also, at $t_2$, the transistor 40 undergoing the test is connected to the program unit by means of the relay 50.

The readout network is shown in FIGURE 8, with connections being set for an exemplary test, namely $BV_{CEX}$. The readout network consists essentially of a plurality of weighted resistors 200–209 connected in series. The resistance values follow a preselected pattern, and in a preferred embodiment of the invention the resistor 200 is .1 ohm, the resistor 201 is .9 ohm, the resistor 202 is 9 ohms, the resistor 203 is 90 ohms, etc., with the resistor 209 being 90M. The "high" side of each resistor 200–205 is connected to a terminal 210–215, respectively. The terminals 210–215 are the current measurement terminals and correspond to full scale current readings of 100 ma. to 1 μa., respectively. (See the Readout Level Selector switch of FIGURE 5.) The "high side" of each resistor 205–209 is connected to a terminal 216–220, respectively. The terminals 216–220 are the voltage measurement terminals and correspond to full scale voltage readings of 10 mv. to 100 v., respectively. The input to the readout network is applied from the transistor-holding socket through switch arms 60 and 59 of the Readout Selector Switch and leads 54 and 53, respectively, to the "high" and "low" sides of the readout network. The "high"

readout network input is fed via lead 64 to the Readout Level switch arm 221 which is connected to one of the terminals 210–220 according to the setting of the Readout Level switch on the program unit control panel. The "low" readout network lead 63 is connected to the bottom of resistor 200. The output from the readout network, which is connected through relay 61 to the differential amplifier, is taken between the "high" side of resistor 205 and the "low" side of resistor 200.

For the $BV_{CEX}$ test, it is desired to measure the voltage between the collector and the emitter. The Readout Selector switch on the program unit control panel of FIGURE 5 is set to the CE position. This sets the switch arms 60 and 59 so that the arm 60 connects the collector lead 44 with the readout lead 54 and the arm 59 connects the emitter lead 43 with the readout lead 53. The base lead 42 is left open. The Readout Level switch on the program unit is set to the 10 v. position, which connects the switch arm 221 to the terminal 219 of the resistor network. This places the proper amount of resistance in the readout circuitry to provide a 10 v. full scale reading.

For the settings of the Readout Selector and Readout Level knobs as shown in FIGURE 5, i.e. for the $h_{FE}$ test, the switch arm 60 would be connected to the side of the base current lead 55 nearest the transistor (to read current out of the base), the switch arm 59 would be connected to the side of the base current lead away from the transistor, and the Readout Level switch arm 221 would be connected to terminal 212 (the 1 ma. terminal) on the resistor network.

In the timing sequence for the testing operation, the desired terminals of the transistor test socket are connected to the readout network by means of relay 51, which is closed at time $t_2$. The Readout Selector switch, of course, has been previously set to the desired position so that when the relay 51 is closed the preselected transistor terminals will be connected to the readout network. At time $t_3$, the relay 61 is closed which connects the output terminals of the readout network to the differential amplifier.

The system of the prsent invention also possesses means to indicate when certain errors in programing have been committed. An example of this is that an alarm will be activated when both Power Supply Selector switches on a program unit are set to the same or to complementary positions. For example, if the Power Supply Selector switch for one power supply is set to the $E_{in}$ position while the Power Supply Selector switch for the other power supply is set to either the $E_{in}$ or the $E_{out}$ position, an alarm will be activated. As a further example, an alarm indication will also be given when both Power Supply Selector switches are set to the BC position, or one to the BC position and the other to the CB position, thus indicating that both power supplies are connected across the same transistor terminals. Alarm light 1 is provided on the program unit control panel (FIGURE 5) for the above purpose. Alarm light 2 is provided to indicate conflicting settings between the auxiliary current regulator and the power supply selector for Power Supply No. 1.

FIGURES 9 ($a$–$k$) are simplified schematic circuit diagrams showing the power supply and readout connections for 11 exemplary tests which may be performed using the apparatus of the present invention. A brief definition of each test, along with the program conditions and the quantities read are given in the annexed Table I. It should be emphasized that FIGURES 9 ($a$–$k$) and Table I are intended only to show examples of how the system of this invention might be used, and are in no way intended to limit the invention to these tests, since the tests which may be programmed on the system are theoretically limited only by the imagination of the programmer. Note that the circuits given in FIGURES 9 ($a$–$k$) are set up for the testing of a PNP transistor; however, they may readily be adapted to testing an NPN transistor simply by reversing the polarity of all connections.

It should be obvious that additional tests of a similar nature to the exemplary tests given in FIGURES 9 ($a$–$k$) and Table I (i.e. tests which merely require the application of suitable bias potentials and/or currents to preselected electrodes of the transistor and the measuring of voltage or current at certain electrodes) may be performed by using the system of the present invention without departing from the scope of the invention. If certain tests are to be substituted for one or more of those tests presently programmed, these tests are simply programmed on the program modules instead of the present tests. Moreover, the same test can be programmed several times with different amplitudes of bias current and voltage. It should also be apparent that a system similar to the one described herein but with a larger number of program modules and a corresponding larger staged shift register is well within the scope of the present invention.

TABLE I

| Test | Definition | Program conditions | Quantity read |
|---|---|---|---|
| $h_{FE}$ | The static value of the short circuit forward current transfer ratio. | $I_C$=10μa. to 100 ma | $I_B$. |
| $BV_{CEX}$ | The breakdown voltage between the collector and emitter, when the collector is biased in the reverse direction with respect to the emitter, and the base is also reverse biased with respect to the emitter. | $I_C$=10 μa. to 100 ma | $V_{CE}$. |
| $V_{PT}$ | The punch-through breakdown voltage between collector and emitter, when the collector is biased in the reverse direction with respect to the emitter, with the base shorted to the emitter. Current is limited by a very high resistance (>1M) in the emitter circuit. | $V_C$=3 to 100 v | $V_{EB}$. |
| $I_{CEO}$ | Collector current when the collector is biased in the reverse (high resistance) direction with respect to the emitter, and base is D.C. open circuited. | $V_C$=3 to 100 v | $I_C$. |
| $I_{CBO}$ | Collector current when the collector is biased in the reverse (high resistance) direction with respect to the base, and the emitter is D.C. open circuited. | $V_C$=3 to 100 v | $I_C$. |
| $I_{EBO}$ | Emitter current when the emitter is biased in the reverse (high resistance) direction with respect to the base, and the collector is D.C. open circuited. | $V_E$=3 to 100 v | $I_E$. |
| $I_{CER}$ | Collector current when the collector is biased in the reverse direction with respect to the emitter, and the base is shunted through a D.C. resistance to the emitter. | $V_C$=3 to 100 v | $I_C$. |
| $BV_{CEO}$ | The breakdown voltage between the collector, and emitter when the collector is biased in the reverse direction with respect to emitter, and the base is open circuited. | $I_C$=10 μa. to 100 ma | $V_{EC}$. |
| $BV_{CBO}$ | The breakdown voltage between the collector, and base when the collector is biased in the reverse direction with respect to the base, and the emitter is open circuited. | $I_C$=10 μa. to 100 ma | $V_{BC}$. |
| $V_{SAT}$ | Collector to emitter voltage when base current is sufficient to maintain transistor in saturated condition under given conditions of collector current. | $I_C$=10 μa to 100 ma; $I_B$=10 μa to 100 ma | $V_{CE}$. |
| $V_{BE}$ | Base to emitter voltage under given conditions of collector to emitter voltage and base to emitter current. | $V_{CE}$=3 to 100 v | $V_{BE}$. |

In the event it is desired to perform a sequence of A.C. measurements, capacitance measurements, or pulse tests on a transistor, the system of the present invention can still be used. When the system is to be adapted for A.C. testing, a second transistor-receiving socket is provided, and a 6-pole 2-position switch is employed to connect the leads 42, 43, 44, 45, 46 and 47 to the second transistor-receiving socket through appropriate A.C. test facilities (which may include A.C. programming units) instead of to the transistor receiving socket 41 of FIGURE 6. The system of the present invention will not only furnish the D.C. biases for the A.C. tests, but will also furnish the timing and control signals necessary to carry out the tests, as well as the means for recording the test results. An A.C.-D.C. converter is used to convert the measured A.C. signal into a D.C. signal suitable for application to the digital voltmeter and the card punch device. Moreover, when the auxiliary A.C. test facilities are employed, the sequence of tests can be made to include not only A.C. tests but both A.C. and D.C. tests.

The preferred embodiment of the invention described above is particularly useful in those applications where flexibility is required. For some more specialized applications, the system would be somewhat difficult, although the basic concept is the same.

For example, one of the limiting factors on the speed of the machine is the time required for the power supplies to stabilize for each test. A higher testing rate can be achieved by using individual power supplies for each test and allowing these power supplies to continuously feed dummy loads thereby reducing or eliminating the stabilization period.

In other instances, it may be desirable to segregate the devices into several classes, each having a rather narrow range of electrical parameters. This can be done by using several High-Low comparators and a lamp bank behind a matrix of containers. If a device's electrical parameters fall within the range established by a particular High-Low comparator, an electrical signal from the High-Low comparator will cause a lamp to light designating the container in which that device should be placed.

Many other changes and modifications will be obvious to those skilled in the art. For example, many types of analogue-to-digital converters could be used to replace the digital voltmeter used. Tapes or magnetic drums could be used for storing the information instead of cards. Stepping relays could be used in place of the binary shift register shown. The invention, therefore, is not to be restricted except insofar as is necessitated by the prior art and by the scope of the appended claims.

What is claimed is:

1. A system for automatically and sequentially performing a plurality of tests on a semiconductor device comprising means for holding a semiconductor device to be tested, programmable means for furnishing D.C. biases for said semiconductor device, first programming means for controlling said programmable means to apply the particular D.C. bias required for each test to said semiconductor device, second programming means for applying an A.C. signal to said semiconductor device, means for controlling said first programming means to cause the sequential application of the D.C. biases suitable for each preselected test to said semiconductor device through said second programming means, and means for measuring at least one preselected A.C. electrical quantity characterizing said semiconductor device after each set of biases has been applied to said semiconductor device.

2. A system for automatically and sequentially performing a plurality of tests on a semiconductor device comprising means for holding a semiconductor device to be tested, programmable means for furnishing D.C. biases for said semiconductor device, first programming means for controlling said programmable means to apply the particular D.C. biases required for each test to said semiconductor device, second programming means for applying an A.C. signal to said semiconductor device, means for controlling said first programming means to cause the sequential application of the D.C. biases suitable for each preselected test to said semiconductor device through said second programming means, means for measuring at least one preselected A.C. electrical quantity characterizing said semiconductor device after each set of biases has been applied to said semiconductor device and for generating A.C. signals indicative of the measured electrical quantities, means for converting the A.C. measurement signals into D.C. signals, and means for recording the values of said D.C. signals.

3. A system for automatically and sequentially performing a plurality of tests on a semiconductor device comprising means for holding a semiconductor device to be tested, programmable means for furnishing D.C. biases for said semiconductor device, a plurality of first programming means, each of said first programming means controlling said programmable means to apply the particular D.C. bias required for each test to said semiconductor device, a plurality of second programming means, each of said second programming means applying an A.C. signal to said semiconductor device, means for controlling each of said first programming means to cause the sequential application of the D.C. biases suitable for each preselected test to said semiconductor device through a preselected one of said second programming means, and means for measuring at least one preselected A.C. electrical quantity characterizing said semiconductor device after each set of biases has been applied to said semiconductor device.

4. A system according to claim 3 including means for converting the A.C. measurement signals into D.C. signals, and means for recording the values of said D.C. signals.

5. A system according to claim 3 wherein said control means includes a shift register.

References Cited by the Examiner

UNITED STATES PATENTS

| | | | |
|---|---|---|---|
| 2,328,750 | 9/1943 | Smith | 324—73 |
| 2,911,594 | 11/1959 | Knight et al. | 324—158 |
| 2,950,437 | 8/1960 | Stahl | 324—73 |
| 2,977,535 | 3/1961 | O'Connor et al. | 324—73 |
| 3,034,051 | 5/1962 | Higgins | 324—73 |

WALTER L. CARLSON, *Primary Examiner.*

SAMUEL BERNSTEIN, JAMES W. LAWRENCE,
*Examiners.*